United States Patent
Kishii

(10) Patent No.: US 7,352,964 B2
(45) Date of Patent: Apr. 1, 2008

(54) CAMERA

(75) Inventor: Daisuke Kishii, Osaka (JP)

(73) Assignee: Funai Electric Co., Ltd. (JP)

( * ) Notice: Subject to any disclaimer, the term of this patent is extended or adjusted under 35 U.S.C. 154(b) by 535 days.

(21) Appl. No.: 11/136,541

(22) Filed: May 25, 2005

(65) Prior Publication Data

US 2005/0271380 A1    Dec. 8, 2005

(30) Foreign Application Priority Data

Jun. 2, 2004    (JP) .............................. 2004-164018

(51) Int. Cl.
G03B 17/02    (2006.01)

(52) U.S. Cl. ........................ 396/299; 70/209

(58) Field of Classification Search ................ 396/297, 396/299; 70/207, 209
See application file for complete search history.

(56) References Cited

U.S. PATENT DOCUMENTS

| 3,956,763 A | * | 5/1976 | Yamanaka | ................... 396/297 |
| 3,964,082 A | | 6/1976 | Mita | .......................... 396/299 |

FOREIGN PATENT DOCUMENTS

| JP | 09-043705 | 2/1997 |
| JP | 09-304818 | 11/1997 |
| JP | 11-258670 | 9/1999 |
| JP | 2003-075898 | 3/2003 |
| JP | 2003-075898 | 12/2003 |

* cited by examiner

*Primary Examiner*—W. B. Perkey
(74) *Attorney, Agent, or Firm*—Bacon & Thomas, PLLC

(57) ABSTRACT

The present invention provides a highly operable easy-to-use camera having a simple configuration without losing a locking function. In a camera comprising: a rotary operation dial 7 to be operated rotationally; a lock arm 5 for locking the rotary operation dial 7 relative to a predetermined position; and a body case 2 to be fitted with the rotary operation dial 7 and the lock arm 5, a rotary operation portion 71 of the rotary operation dial 7 and a button operation portion 51 of the lock arm 5 are disposed in proximity to each other on adjacent faces of the body case 2; a lock groom 73 formed in a predetermined position of a lower face rib 72 of the rotary operation dial 7, the lower face rib 72 lying inside the body case 2, is arranged in such a manner that a fitting portion 53 of the lock arm 5 can be fitted thereinto; and an urging means 9 for urging the lock arm 5 from inside to outside of the body case 2 is provided.

8 Claims, 4 Drawing Sheets

CAMERA

CROSS-REFERENCE TO RELATED APPLICATIONS

This application claims, under 35 USC 119, priority of Japanese Application No. 2004-164018 filed Jun. 2, 2004.

BACKGROUND OF THE INVENTION

1. Field of the Invention

The present invention relates to a camera having a locking function for locking a rotary operation dial to be operated rotationally, such as a mode setting dial, relative to a rotational predetermined position, and particularly aims at improving its operationality.

2. Description of the Prior Art

As is well known, a camera employs rotary operation dials such as a mode setting dial, shutter speed setting dial, and exposure compensation value setting dial so that the selection among a plurality of setting information can be operated at the same section. In such an arrangement, when a rotary operation dial is rotated by an accidental force to result in a switching of the photographing mode, there may be brought an unintended result, which can be a cause of trouble in a worse case.

In consideration of the above-described points, there has conventionally been known an arrangement that a push button is provided next to a rotary operation dial in the same plane, and that a lock spring is moved downward through the push button to release a lock lever fitted into a groove formed in the lower face of the rotary operation dial (refer to Japanese Patent Laid-Open Publication No. 2003-75898 for example).

However in accordance with the arrangement according to the foregoing patent document, the push button for releasing the lock lever is provided next to the rotary operation dial in the same plane, and the rotary operation dial is required to be operated while pressing the push button in the same plane, which naturally requires two-hand control, resulting in poor operationality. There has particularly been a problem that in the case of a small digital camera, it is difficult to hold the camera body, and therefore two-hand control in the same plane is extremely inconvenient.

SUMMARY OF THE INVENTION

The present invention has been made to solve the above-described problems, and an object thereof is to provide a highly operable easy-to-use camera having a simple configuration without losing a locking function.

In order to achieve the above-described object, the invention according to claim 1 provides a camera comprising: a rotary operation dial to be operated rotationally; a lock arm for locking the rotary operation dial relative to a predetermined position; and a body case to be fitted with the rotary operation dial and the lock arm, wherein a rotary operation portion of the rotary operation dial and a button operation portion of the lock arm are disposed in proximity to each other on adjacent faces of the body case; a lock groom formed in a predetermined position of a lower face rib of the rotary operation dial, the lower face rib lying inside the body case, is arranged in such a manner that a fitting portion of the lock arm can be fitted thereinto; and an urging means for urging the lock arm from inside to outside of the body case is provided.

The invention according to claim 2 provides a camera comprising: a rotary operation dial to be operated rotationally; a lock arm for locking the rotary operation dial relative to a predetermined position; and a body case to be fitted with the rotary operation dial and the lock arm, wherein a rotary operation portion of the rotary operation dial and a button operation portion of the lock arm are disposed in proximity to each other on adjacent faces of the body case.

In the invention according to claim 3, the rotary operation portion of the rotary operation dial and the button operation portion of the lock arm are disposed in proximity to each other, respectively, on the upper face side and the back face side of the body case.

In the invention according to claim 4, the urging means is made up of a plate spring.

In the invention according to claim 5, L-shaped holding parts are formed inside the body case and on either side of a through-hole through which the lock arm passes, the holding parts holding the urging means.

In the invention according to claim 6, the urging means is made up of a coil spring.

In the invention according to claim 7, the lock arm is composed: of a first member having a button operation portion and a groove portion in which the urging means is to be disposed circumferentially, the first member being inserted from outside the body case; and a second member having a fitting portion to be fitted into the lock groove formed in the lower face rib, the second member being fixed integrally to the first member.

In the invention according to claim 8, a projection is formed on the lower face of the first member, while a hole, into which the projection is to be fitted, is formed in the second member, the projection being fitted into the hole to fix the first member and the second member integrally to each other.

In accordance with the arrangement of the invention according to claim 1, the rotary operation portion to be operated rotationally and the button operation portion of the lock arm for lock release operation are disposed in proximity to each other on adjacent faces of the body case, whereby when operating the rotary operation dial, it is possible to press the button operation portion of the lock arm using the thumb of a hand holding the camera body, and thereby to move the lock arm toward the body case against the urging means to release the fitting of the fitting portion of the lock arm to the lock groove formed in the lower face rib of the rotary operation portion, and then in the released state, the rotary operation portion can be rotated using the forefinger, etc. to provide a desired setting. Also in the case of two-hand control, it is possible to press the button operation portion of the lock arm while holding the camera body using one hand, and then similarly as mentioned above, in the released state, the rotary operation portion can be rotated using the other hand to provide a desired setting. Therefore, the operation of, for example, mode setting can be performed easily, resulting in an improvement of the operationality of a camera of this kind. In addition, there is exhibited an effect that it is only required to arrange extremely simply that the rotary operation portion of the rotary operation dial and the button operation portion of the lock arm are disposed in proximity to each other on adjacent faces of the body case.

In accordance with the arrangement of the invention according to claim 2, the rotary operation portion to be operated rotationally and the button operation portion of the lock arm for lock release operation are disposed in proximity to each other on adjacent faces of the body case, whereby when operating the rotary operation dial, it is possible to press the button operation portion of the lock arm using the thumb of a hand holding the camera body, and then in the released state, the rotary operation portion can be rotated using the forefinger, etc. to provide a desired setting. Also in the case of two-hand control, it is possible to press the button operation portion of the lock arm while holding the camera body using one hand, and then in the released state, the rotary operation portion can be rotated using the other hand to provide a desired setting. Therefore, the operation of, for example, mode setting can be performed easily, resulting in an improvement of the operationality of a camera of this kind. In addition, there is exhibited an effect that it is only required to arrange extremely simply that the rotary operation portion of the rotary operation dial and the button operation portion of the lock arm are disposed in proximity to each other on adjacent faces of the body case.

In accordance with the arrangement of the invention according to claim 3, the rotary operation portion to be operated rotationally and the button operation portion of the lock arm for lock release operation are disposed in proximity to each other, respectively, on the upper face side and the back face side of the body case, whereby there is exhibited an effect that the rotary operation dial, which can be operated while holding the camera in a normal photographing state and releasing the lock, achieves high operationality.

In accordance with the arrangement of the invention according to claim 4, the urging means is made up of a plate spring, and therefore can be arranged along the inner wall of the body case, which advantageously allows space saving in a camera of this kind.

In accordance with the arrangement of the invention according to claim 5, the urging means is held by the L-shaped holding parts formed on the inner wall of the body case, whereby no special part is required to hold the urging means, but it is only required to form the holding parts integrally with the body case, where in the case of, for example, allowing the body case to be molded of synthetic resin, it is advantageously only required to provide a die.

In accordance with the arrangement of the invention according to claim 6, the urging means is made up of a coil spring, resulting economically in cost reduction in comparison with the case of employing a plate spring.

In accordance with the arrangement of the invention according to claim 7, the first member, in the groove portion of which is disposed the urging means circumferentially, is inserted from outside the body case, while the second member is inserted from inside the body case, the first member and the second member being fixed integrally to each other, which allows the body case to be fitted with the lock arm easily. Therefore, it is advantageously possible to improve the workability.

In accordance with the arrangement of the invention according to claim 8, in order to fix the first member and the second member to each other, it is only required to fit the projection provided on the lower face of the first member to the hole formed in the second member, which advantageously allows the lock arm to be assembled without using any special tool.

DESCRIPTION OF THE PREFERRED EMBODIMENTS

In a camera comprising: a rotary operation dial to be operated rotationally; a lock arm for locking the rotary operation dial relative to a predetermined position; and a body case to be fitted with the rotary operation dial and the lock arm, a rotary operation portion of the rotary operation dial and a button operation portion of the lock arm are disposed in proximity to each other, respectively, on the upper face side and the back face side of the body case; a lock groom formed in a predetermined position of a lower face rib of the rotary operation dial, the lower face rib lying inside the body case, is arranged in such a manner that a fitting portion of the lock arm can be fitted thereinto; and an urging means for urging the lock arm from inside to outside of the body case is provided.

Figure 1:
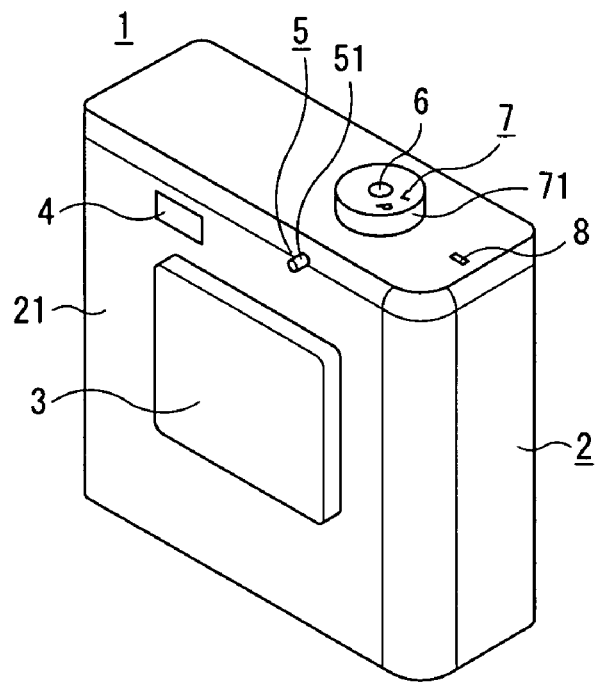
FIG. 1 is a perspective view showing a schematic configuration of a camera having a locking function according to an embodiment of the present invention.
Figure 2:
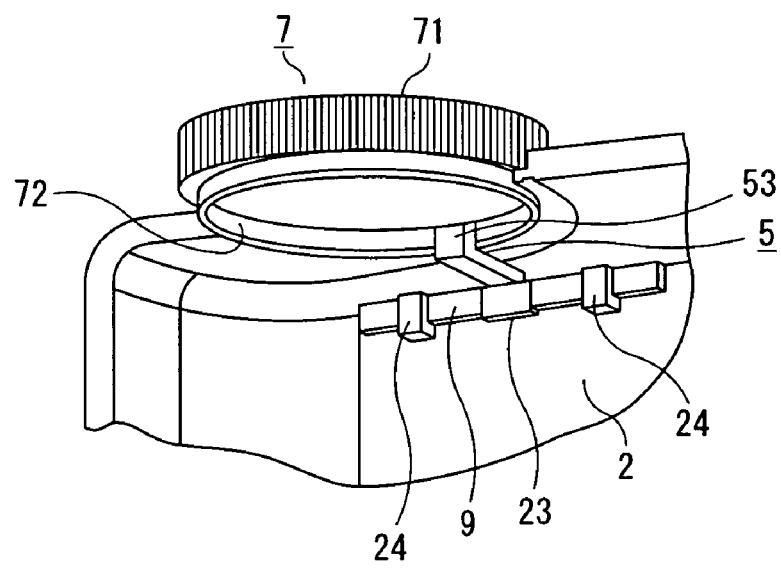
FIG. 2 is a partial cross-sectional perspective view showing a substantial part of the camera according to the embodiment of the present invention shown in FIG. 1.
Figure 3:
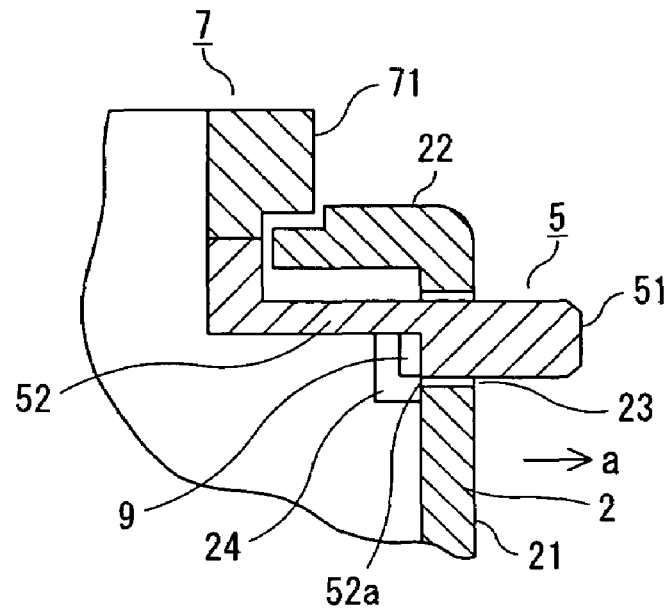
FIG. 3 is also a partial cross-sectional view of the substantial part of the camera according to the embodiment of the present invention shown in FIG. 1, showing a locked state.
Figure 4:
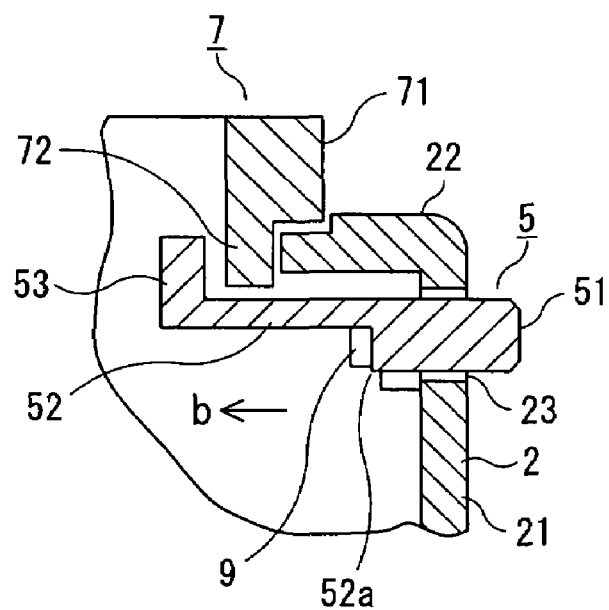
FIG. 4 is also a partial cross-sectional view of the substantial part of the camera according to the embodiment of the present invention shown in FIG. 1, showing an unlocked state.
Figure 5:
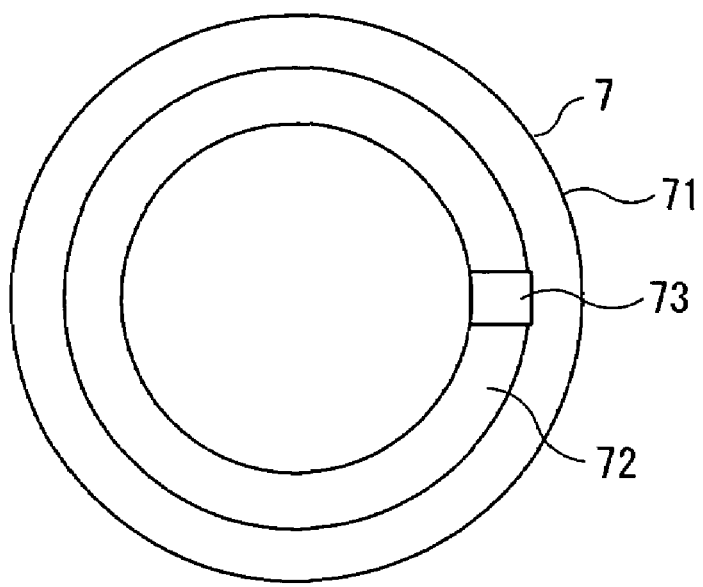
FIG. 5 is a bottom plan view of a rotary operation dial of the camera according to the embodiment of the present invention shown in FIG. 1.

An embodiment of the present invention will hereinafter be described with reference to FIGS. 1 to 5. FIG. 1 is a perspective view showing a schematic configuration of a camera having a locking function according to the embodiment of the present invention; FIG. 2 is a partial cross-sectional perspective view showing a substantial part of the camera according to the embodiment of the present invention shown in FIG. 1; FIGS. 3 and 4 are also partial cross-sectional views of the substantial part of the camera according to the embodiment of the present invention shown in FIG. 1, where FIG. 3 shows a locked state, while FIG. 4 an unlocked state; and FIG. 5 is a bottom plan view of a rotary operation dial of the camera according to the embodiment of the present invention shown in FIG. 1.

In the back face 21 of the body case 2 of the camera 1 shown in FIG. 1 are arranged, for example, a liquid crystal display section 3, a finder window 4, and a button operation portion 51 of a lock arm 5. In the upper face 22 of the body case 2 are arranged, for example, a shutter button 6, a rotary operation dial 7 to be operated rotationally when, for example, performing mode setting, and an indicator section 8 for indicating a sign displayed on the upper face of the rotary operation dial 7. A settable mode such as switch-on, switch-off "L", or program mode "P" is displayed as a sign. Therefore, rotating a rotary operation portion 71 of the rotary operation dial 7 and thereby setting the indicator section 8 to a desired sign makes an electrical connection, though not shown in the figure, to carry the sign to the control section of the camera body for mode setting. In the front face are also arranged a photographing lens and an electronic flash not shown in the figure.

Then, in accordance with the present invention, the rotary operation portion 71 of the rotary operation dial 7 to be operated rotationally and the button operation portion 51 of the lock arm 5 are disposed in proximity to each other on adjacent faces of the body case 2 as mentioned above. That is, in the example shown in the figure, the rotary operation portion 71 of the rotary operation dial 7 and the button operation portion 51 of the lock arm 5 are disposed in proximity to each other, respectively, on the upper face 22 and the back face 21 of the body case 2. In a predetermined position of a lower face rib 72 of the rotary operation dial 7, the lower face rib 72 lying inside the body case 2, that is, in a position where to be locked is formed a lock groove 73. It will be appreciated that the plural lock grooves 73 may be provided if necessary, though one lock groove 73 is exemplified in the figure.

The lock arm 5 consists of a button operation portion 51, a trunk portion 52, and a fitting portion 53, the fitting portion 53 being arranged, in a locked state, in such a manner as to be fitted into the lock groove 73 formed in the lower face rib 72. In addition, the lock arm 5 is constantly urged by an urging means 9 in the direction of the arrow "a" (refer to FIG. 3), that is, toward the outside of the body case 2. Therefore in a locked state, the fitting portion 53 is fitted into the lock groove 73, and the state is maintained by the urging means 9.

The urging means 9 employs, for example, a plate spring, the urging means 9 thus made up of the spring plate being installed and held between L-shaped holding parts 24 formed on the inner wall of the body case 2 and on either side of a through hole 23 through which the trunk portion 52 of the lock arm 5 passes, and it is advantageous that the urging means 9 urges a stepped portion 52a in the trunk portion 52 of the lock arm 5. Thus, employing a plate spring allows the urging means 9 to be arranged along the inner wall of the body case 2, which advantageously allows space saving. In addition, installing and holding the urging means 9 between the L-shaped holding parts 24 formed on the inner wall of the body case 2 requires no special part to hold the urging means 9. Further, it is only required to form the holding parts 24 integrally with the body case 2, where in the case of, for example, allowing the body case 2 to be molded of synthetic resin, it is advantageously only required to provide a die.

The mode setting in thus arranged camera according to the present first embodiment will be described here. For example, when switching the camera 1 from the switch-off "L" state (refer to FIG. 3) to the program mode "P" state for photographing, it is possible to press the button operation portion 51 of the lock arm 5 in the direction of the arrow "b" shown in FIG. 4 using the thumb of a hand holding the camera 1, and thereby to move (press) the lock arm 5 toward the body case 2 against the urging means 9 to release the fitting of the fitting portion 53 of the lock arm 5 to the lock groove 73 formed in the lower face rib 72 of the rotary operation dial 7, and then in the released state (refer to FIG. 4), the rotary operation portion 71 can be rotated using the forefinger, etc. to set the indicator section 8 to the sign of program mode "P" to provide a desired setting. Subsequently, when the pressure applied to the button operation portion 51 is released, the lock arm 5 is urged by the urging means 9 in the opposite direction of the arrow "b" shown in FIG. 4, and the state of the lower face rib 72 of the rotary operation portion 71 is maintained by the fitting portion 53. In this case, it is preferable to form a recessed portion (not shown in the figure), with which the fitting portion 53 is to engage, in a predetermined position inside the lower face rib 72 to perform positioning operations reliably.

Also in the case of two-hand control, it is possible to press the button operation portion 51 of the lock arm 5 in the direction of the arrow "b" shown in FIG. 4 while holding the camera 1 using one hand, and then similarly as mentioned above, in the released state, the rotary operation portion 71 can be rotated using the other hand to set the indicator section 8 to the sign of program mode "P" to provide a desired setting. It is then advantageous that the pressure applied to the button operation portion 51 is released after the corresponding positional relationship between the lock groove 73 and the fitting portion 53 has been removed.

In accordance with thus arranged embodiment, the rotary operation portion 71 to be operated rotationally and the button operation portion 51 of the lock arm 5 for lock release operation, which are required to be operated simultaneously without losing a locking function, are disposed in proximity to each other on adjacent faces of the body case 2, whereby the operation of, for example, mode setting can be performed easily, resulting in an improvement of the operationality of a camera of this kind. In addition, there is exhibited an effect that such a camera can be configured extremely simply.

Figure 6:
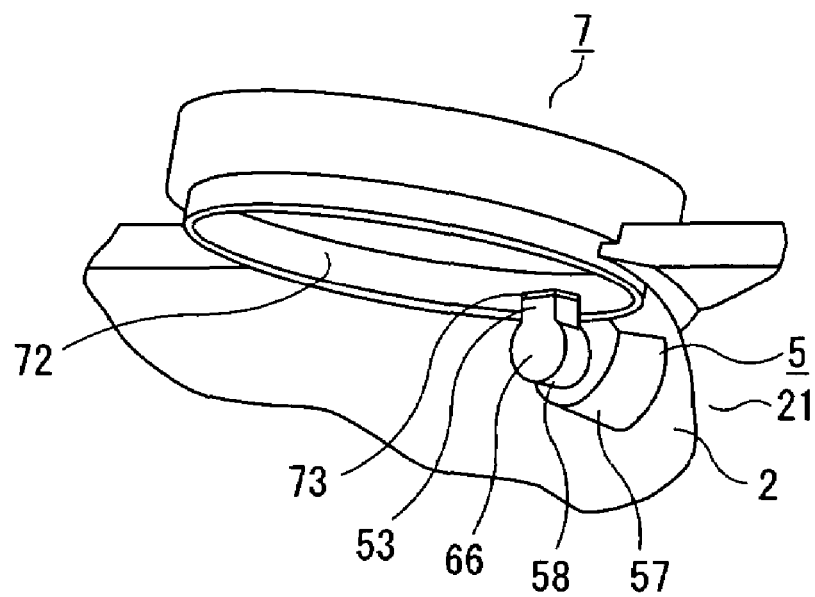
FIG. 6 is a partial cross-sectional perspective view showing a substantial part of a camera according to another embodiment of the present invention.
Figure 7:
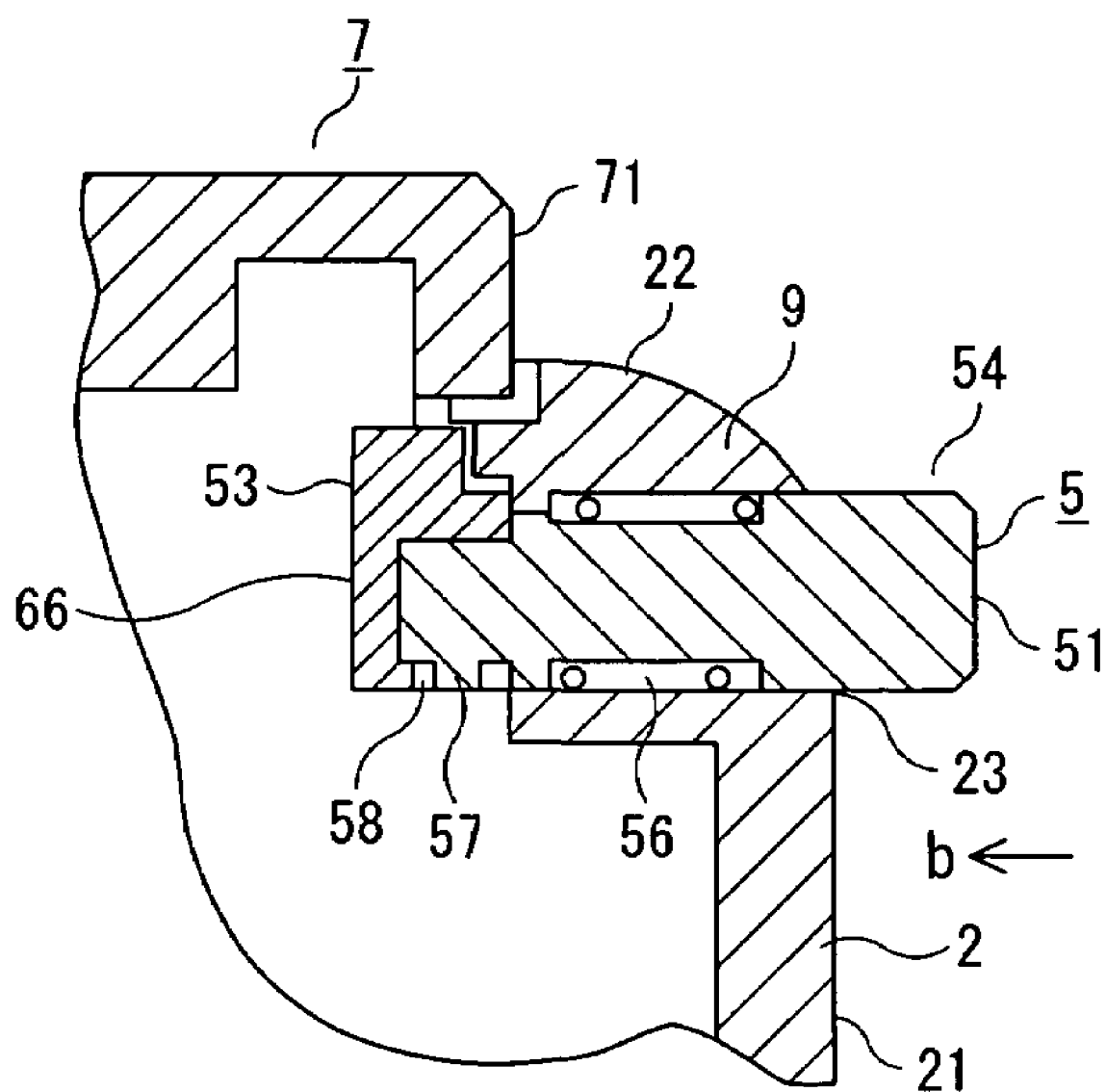
FIG. 7 is a partial cross-sectional view of the substantial part of the camera according to the embodiment of the present invention shown in FIG. 6.

Next will be described another embodiment of the present invention shown in FIGS. 6 and 7. FIG. 6 is a partial cross-sectional perspective view showing a substantial part of a camera according to another embodiment of the present invention; and FIG. 7 is a partial cross-sectional view of the substantial part of the camera according to the embodiment of the present invention shown in FIG. 6. It is noted that in FIGS. 6 and 7, components designated with the same reference numerals as those in FIGS. 1 to 5 indicate approximately the same ones. Differences will hereinafter be described mainly.

In the present embodiment, the urging means 9 employs a coil spring, while the lock arm 5 is composed of a first member 54 and a second member 55. The first member 54, which has a button operation portion 51 and a groove portion 56 adapted to dispose a coil spring as the urging means 9 circumferentially around the trunk portion 52, is inserted from outside the body case 2. The second member 55, which has a fitting portion 53 to be fitted into the lock groove 73 formed in the lower face rib 72 of the rotary operation portion 71, lies inside the body case 2 to be fixed integrally to the first member 54. In order to provide the fixation, it is advantageous, for example, that a projection 57 is formed on the first member 54, while a hole 58, into which the projection 57 is to be fitted, is formed in the second member 55, the projection 57 being fitted into the hole 58. It will then be appreciated that the fixing means for fixing the first member 54 and the second member 55 to each other is not restricted to the above-described method of fitting the projection 57 into the hole 58, but may employ another means such as screwing or adhesion.

In accordance with thus arranged embodiment, the rotary operation portion 71 to be operated rotationally and the button operation portion 51 of the lock arm 5 for lock release operation, which are required to be operated simultaneously without losing a locking function, are disposed in proximity to each other on adjacent faces of the body case 2, as is the case with the above-described embodiment, whereby there is exhibited an effect that the operation of, for example, mode setting can be performed easily, resulting in an improvement of the operationality of a camera of this kind.

Also, the urging means 9 is made up of a coil spring, resulting economically in cost reduction in comparison with the case of employing a plate spring.

In addition, the first member 54, in the groove portion 56 of which is disposed the urging means 9 circumferentially, is inserted from outside the body case 2, while the second member 55 is inserted from inside the body case 2, the first member 54 and the second member 55 being fixed integrally to each other, which allows the body case 2 to be fitted with the lock arm 5 easily. Therefore, it is advantageously possible to improve the workability.

Further, in order to fix the first member 54 and the second member 55 to each other, it is only required to fit the projection 57 provided on the lower face of the first member 54 to the hole 58 formed in the second member 55, which advantageously allows the lock arm 5 to be assembled without using any special tool.

It is noted that although the above-described embodiments are preferred embodiments of the present invention, the present invention is not restricted thereto, but may be embodied in other specific forms without departing from the gist thereof.

What is claimed is:

1. A camera comprising: a rotary operation dial to be operated rotationally; a lock arm for locking said rotary operation dial relative to a predetermined position; and a body case to be fitted with said rotary operation dial and said lock arm, wherein
   a rotary operation portion of said rotary operation dial and a button operation portion of said lock arm are disposed in proximity to each other on adjacent faces of said body case; a lock groom formed in a predetermined position of a lower face rib of said rotary operation dial, said lower face rib lying inside said body case, is arranged in such a manner that a fitting portion of said lock arm can be fitted thereinto; and an urging means for urging said lock arm from inside to outside of said body case is provided.

2. A camera comprising: a rotary operation dial to be operated rotationally; a lock arm for locking said rotary operation dial relative to a predetermined position; and a body case to be fitted with said rotary operation dial and said lock arm, wherein
   a rotary operation portion of said rotary operation dial and a button operation portion of said lock arm are disposed in proximity to each other on adjacent faces of said body case.

3. The camera according to claim 1, wherein said rotary operation portion of said rotary operation dial and said button operation portion of said lock arm are disposed in proximity to each other, respectively, on the upper face side and the back face side of said body case.

4. The camera according to claim 1, wherein said urging means is a plate spring.

5. The camera according to claim 1, wherein L-shaped holding parts are formed inside said body case and on either side of a through-hole through which said lock arm passes, said holding parts holding said urging means.

6. The camera according to claim 1, wherein said urging means is a coil spring.

7. The camera according to claim 1, wherein said lock arm is composed of: a first member having a button operation portion and a groove portion in which said urging means is to be disposed circumferentially, said first member being inserted from outside said body case; and a second member having a fitting portion to be fitted into said lock groove formed in said lower face rib, said second member being fixed integrally to said first member.

8. The camera according to claim 7, wherein a projection is formed on the lower face of said first member, while a hole, into which said projection is to be fitted, is formed in said second member, said projection being fitted into said hole to fix said first member and said second member integrally to each other.

* * * * *